Patented May 4, 1954

2,677,707

UNITED STATES PATENT OFFICE 2,677,707

REACTION OF ORTHOTHIOESTERS WITH STYRENES

John W. Copenhaver, Short Hills, N. J., assignor to General Aniline & Film Corporation, New York, N. Y., a corporation of Delaware No Drawing. Application September 22, 1950, Serial No. 186,314

10 Claims. (Cl. 260—609)

1

This invention relates to a method of preparing reaction products of orthothioesters with a styrene and to the compounds produced thereby.

I have discovered that such reaction products can be prepared by reacting an orthothioester with a styrene in the presence of an acid-reacting condensing agent as more fully described below.

The reaction involved in the present invention may be formulated as follows:

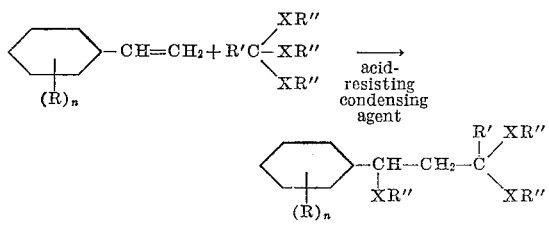

wherein R' is hydrogen or hydrocarbon, preferably alkyl and more preferably lower alkyl; X is a chalcogen of atomic weight less than 33, i. e., oxygen or sulfur with the proviso that at least one of the X's is sulfur; the R'''s are radicals of an alcohol or phenol, e. g., aliphatic, aromatic, alicyclic radicals including oxygen and sulfur-interrupted aliphatic hydrocarbon radicals, or two of the R'''s in the orthothioester may together be a bivalent radical of a polyhydric alcohol, polythiol or a mercapto alcohol; R represents any inert substituent or substituents such as hydrogen, lower alkyl, e. g., methyl, ethyl, propyl, isopropyl, butyl, etc., cyano, trifluoromethyl, lower alkoxy, e. g., methoxy, ethoxy, propoxy, butoxy, etc., halogen, e. g., chlorine, bromine and fluorine, etc.; and $n$ is an integer from 1 to 5.

As examples of orthothioesters which may be employed in practicing the present invention may be mentioned the orthotrithioesters, orthodithioesters and orthomonothioesters of formic, acetic, propionic, butyric, benzoic, phenylacetic acids and the like with alcohols and thiols, such as the methyl, ethyl, propyl, butyl, allyl, cyclohexyl, benzyl and phenyl ethyl alcohols and mercaptans, ethane, propane and butane dialcohols and dithiols, phenol, thiophenol, cresols, thiocresols, mercaptoethanol, diethylene glycol and monoalkyl ethers thereof, di(betahydroxyethyl) sulfide and monoalkyl ethers thereof, di(hydroxyphenyl) ether, di(hydroxyphenyl) thioether, and the like. The lower alkyl orthothioesters of lower fatty acids are preferred, such as methyl thioorthoformate, ethyl thioorthoformate, propyl thioorthoformate and the like. The terms "alcohol"

2 and "phenol" as employed herein and in the appended claims include mono- and polyhydric alcohols and phenols and sulphur analogs thereof.

While styrene itself is the preferred reactant with the orthothioester, derivatives thereof substituted by hydrocarbons and other inert groups which will not affect the reactivity of the ethylenic bond may also be employed, as indicated hereinbefore. Thus, it will be understood that the number and variety of substituents in the aromatic ring and their positions thereon is immaterial so long as the contemplated reaction is not thereby prevented. The following may be mentioned for illustrative purposes only as examples of some suitable styrenes which may be employed:

| | |
|---|---|
| o-chlorostyrene | 2,4-dichlorostyrene |
| m-chlorostyrene | 2,5-dichlorostyrene |
| p-chlorostyrene | 2,6-dichlorostyrene |
| m-bromostyrene | 3,4-dichlorostyrene |
| p-bromostyrene | 3,5-dichlorostyrene |
| o-fluorostyrene | o-cyanostyrene |
| p-fluorostyrene | m-cyanostyrene |
| o-methoxystyrene | p-cyanostyrene |
| m-methoxystyrene | 3,5-dimethylstyrene |
| p-methoxystyrene | 2,4-dimethylstyrene |
| p-ethoxystyrene | 2,5-dimethylstyrene |
| m-trifluoromethyl-styrene | 3,4-dimethylstyrene |
| | m-t-butylstyrene |
| m-methylstyrene | m-s-butylstyrene |
| 2,3-dichlorostyrene | |

The catalyst employed in practicing the present invention is, as mentioned, an acid-reacting condensing agent. As examples of suitable catalysts there may be mentioned such acid-reacting condensing agents as boron trifluoride and its complexes with ether, boron trichloride, stannic chloride, titanium chloride, sulfuric acid and the like. The amount of catalyst is not highly critical and may be varied from mere traces to about 0.1 mol of catalyst per mol of orthothioester. However, for best results, employing a catalyst like boron trifluoride, amounts within the range of 0.0001 to 0.01 mol of catalyst per mol of orthothioester are employed.

It has been found that the reaction is operable through a relatively wide temperature range and no critical limits for temperature have been established. However, while temperatures below 0.° C. are operative, no advantage has been found in employing lower temperatures and likewise temperatures above about 50° C. are preferably avoided, since there is no advantage in their use, although the process is operative at temperatures of 100° C. or even higher. When the temperature employed is above the boiling point of any of the reactants, the process can advantageously be carried out under superatmospheric pressure; otherwise, atmospheric pressure may be employed.

The following example illustrates a specific embodiment of the invention, although it is to be understood that the invention is not to be limited thereby.

*Example*

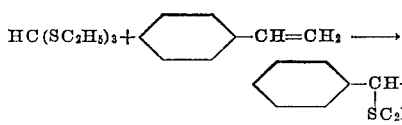

588 g. (3.0 moles) of ethyl trithio-orthoformate and 2 ml. boron fluoride etherate was charged to a glass reactor and 104 g. (1 mole) of freshly distilled styrene added dropwise during 0.5 hour.

The reaction was mildly exothermic, the reaction temperature rising about 2° C. An additional 2 ml. of boron fluoride etherate was added and the reaction mixture heated 6 hours at 50° C. The catalyst was neutralized with diethanolamine and distilled in the presence of a p-tert-butyl catechol. After removing a small amount of unreacted styrene and the excess thioorthoformate, 1,1,3-trithioethyl-3-phenyl propane was isolated as a light yellow somewhat viscous liquid, 171–6° C./2 mm., $n_D^{25}$ 1.5746. The identity of this product was proven by reaction with 2,4-dinitrophenylhydrazine to give the 2,4-dinitrophenyl hydrazone of cinnamaldehyde, M. P. 254–5° C. with decomposition.

*Analysis.*—Calc. for $C_{15}H_{12}O_4N_4$: C, 57.69; H, 3.88; N, 17.94. Found: C, 57.75; H, 4.15; N, 17.81.

The melting point of cinnamic aldehyde 2,4-dinitrophenyl hydrazone is reported as 255° C. with decomposition.

The products of the present invention are useful in preparing antidusting dyestuff compositions, antioxidant compositions for rubber and lubricating oils, and as chemical intermediates for further synthesis. Thus, the products may be converted to cinnamaldehydes which are useful in perfumery.

My invention has been described with respect to certain preferred embodiments thereof but various modifications and variations within the spirit and scope of the invention will become apparent to those skilled in the art. It is accordingly understood that such modifications and variations are to be considered as within the purview of this application and the scope of the appended claims.

I claim:

1. The process which comprises reacting an orthothioester with a styrene in the presence of an acid-reacting condensing agent.

2. The process which comprises reacting a lower alkylorthothioester with a styrene in the presence of an acid-reacting condensing agent.

3. The process which comprises reacting a lower alkylorthothioester of a lower fatty acid with a styrene in the presence of an acid-reacting condensing agent.

4. The process which comprises reacting ethyl trithioorthoformate with a styrene in the presence of an acid-reacting condensing agent.

5. The process which comprises reacting an orthothioester with styrene in the presence of an acid-reacting condensing agent.

6. The process which comprises reacting a lower alkylorthothioester with styrene in the presence of an acid-reacting condensing agent.

7. The process which comprises reacting a lower alkylorthothioester of a lower fatty acid with styrene in the presence of an acid-reacting condensing agent.

8. The process which comprises reacting ethyl trithioorthoformate with styrene in the presence of an acid-reacting condensing agent.

9. A compound of the general formula:

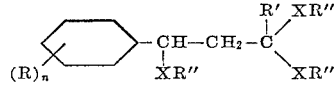

wherein R' is selected from the group consisting of hydrogen and hydrocarbon radicals; X is selected from the group consisting of —O— and —S—, at least one of said X's being sulfur; the R'''s are selected from a group consisting of alcohol and phenol radicals; R is selected from the group consisting of hydrogen and inert substituents; and n is an integer from 1 to 5.

10. The compound of the formula:

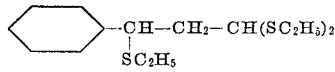

References Cited in the file of this patent

UNITED STATES PATENTS

| Number | Name | Date |
|---|---|---|
| 2,191,564 | Graenacher et al. | Feb. 27, 1940 |
| 2,352,435 | Hoeffelman et al. | June 27, 1944 |
| 2,369,612 | Schirm | Feb. 13, 1945 |
| 2,392,294 | Rust et al. | Jan. 1, 1946 |
| 2,500,486 | Copenhaver | Mar. 14, 1950 |